(12) United States Patent
Nagahashi et al.

(10) Patent No.: US 12,214,629 B2
(45) Date of Patent: Feb. 4, 2025

(54) PNEUMATIC TIRE

(71) Applicant: The Yokohama Rubber Co., LTD., Tokyo (JP)

(72) Inventors: Yuki Nagahashi, Kanagawa (JP); Noriyoshi Koyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 71 days.

(21) Appl. No.: 17/998,440

(22) PCT Filed: Apr. 12, 2021

(86) PCT No.: PCT/JP2021/015205
§ 371 (c)(1),
(2) Date: Nov. 10, 2022

(87) PCT Pub. No.: WO2021/229976
PCT Pub. Date: Nov. 18, 2021

(65) Prior Publication Data
US 2023/0226858 A1    Jul. 20, 2023

(30) Foreign Application Priority Data

May 15, 2020   (JP) ................. 2020-086072

(51) Int. Cl.
*B60C 17/00*    (2006.01)
*B60C 15/06*    (2006.01)
*B60C 19/00*    (2006.01)

(52) U.S. Cl.
CPC ...... *B60C 17/0009* (2013.01); *B60C 15/0603* (2013.01); *B60C 19/002* (2013.01); *B60C 2015/061* (2013.01)

(58) Field of Classification Search
CPC .................................................. B60C 19/002
See application file for complete search history.

(56) References Cited

U.S. PATENT DOCUMENTS

2013/0199688 A1* 8/2013 Nakazaki ............ B60C 17/0009
152/517
2016/0297261 A1* 10/2016 Tanno .................. B60C 19/002
(Continued)

FOREIGN PATENT DOCUMENTS

| CN | 108463357 A | 8/2018 |
| CN | 110944854 A | 3/2020 |

(Continued)

OTHER PUBLICATIONS

English machine translation of JP 2009-132234 A, Jun. 18, 2009.*
(Continued)

*Primary Examiner* — Adrienne C. Johnstone
(74) *Attorney, Agent, or Firm* — Thorpe North & Western

(57) ABSTRACT

Provided is a pneumatic tire. A band-like sound absorptive member is fixed to the inner surface of a tread portion along the tire circumferential direction. An end portion in the tire width direction of the sound absorptive member is located on the outer side in the tire width direction with respect to a shoulder main groove located on the outermost side in the tire width direction. A width W1 of the sound absorptive member in the tire width direction and a tread development width TDW of the tread portion satisfy a relationship of $0.65 \leq (W1/TDW) \leq 0.90$. The width W1 of the sound absorptive member and a belt width W2 of a first belt ply having the maximum width of a belt layer satisfy a relationship of $0.70 \leq (W1/W2) \leq 0.95$.

14 Claims, 6 Drawing Sheets

(56) References Cited

U.S. PATENT DOCUMENTS

| | | |
|---|---|---|
| 2019/0030963 A1 | 1/2019 | Shinzawa |
| 2020/0139768 A1 | 5/2020 | Shibata et al. |
| 2020/0324583 A1 | 10/2020 | Kameda |
| 2020/0338935 A1 | 10/2020 | Naruse |

FOREIGN PATENT DOCUMENTS

| | | | |
|---|---|---|---|
| CN | 111094021 A | | 5/2020 |
| DE | 10 2015 216 388 A1 | * | 3/2017 |
| DE | 10 2018 213 480 A1 | | 2/2020 |
| DE | 11 2018 004 598 T5 | | 5/2020 |
| EP | 3 640 046 A1 | | 4/2020 |
| JP | H09-11714 A | | 1/1997 |
| JP | 2009132234 A | * | 6/2009 |
| JP | 2012-96656 A | | 5/2012 |
| JP | 2012111382 A | * | 6/2012 |
| JP | 2019-026019 A | | 2/2019 |
| JP | 2019-151301 A | | 9/2019 |
| WO | 2015/076382 A1 | | 5/2015 |
| WO | 2015/111314 A1 | | 7/2015 |
| WO | 2015/115162 A1 | | 8/2015 |
| WO | 2017/126278 A1 | | 7/2017 |
| WO | 2017/135004 A1 | | 8/2017 |
| WO | 2019/021724 A1 | | 1/2019 |
| WO | 2019/078280 A1 | | 4/2019 |
| WO | 2019/093005 A1 | | 5/2019 |
| WO | WO 2020/030348 A1 | | 2/2020 |

OTHER PUBLICATIONS

English machine translation of JP 2012-111382 A, Jun. 14, 2012.*
English machine translation of DE 10 2015 216 388 A1, Mar. 2, 2017.*
English machine translation of JP 2019-151301 A, Sep. 12, 2019.*
Mechanics of Pneumatic Tires, ed. Samuel Clark, US Dept. of Transportation, Aug. 1981, pp. 219-220.*

* cited by examiner

| | Conventional Example 1 | Comparative Example 1 | Comparative Example 2 | Comparative Example 3 | Comparative Example 4 |
|---|---|---|---|---|---|
| W1/TDW | 0.65 | 0.60 | 0.95 | 0.70 | 0.70 |
| W1/W2 | 0.61 | 0.65 | 1.00 | 0.75 | 0.75 |
| Volume (%) of sound absorptive member with respect to tire cavity volume | - | 20 | 20 | 20 | 20 |
| Separation distance L1 (mm) between side reinforcing rubber and sound absorptive member | 9 | 16 | 16 | 16 | 16 |
| Density of sound absorptive member (kg/m$^3$) | - | 25 | 25 | 25 | 25 |
| Number of cells of sound absorptive member per 25 mm | - | 50 | 50 | 50 | 50 |
| End-to-end distance L2 (mm) between side reinforcing rubber and first belt ply | 30 | 10 | 10 | 4 | 26 |
| L2/W2 | 0.32 | 0.06 | 0.06 | 0.02 | 0.16 |
| L3/W3 | 0.54 | 0.10 | 0.10 | 0.10 | 0.10 |
| H1/SH (%) | 64 | 25 | 25 | 25 | 25 |
| Run-flat durability (index value) | 100 | 105 | 95 | 97 | 97 |
| Sound absorbing performance (index value) | 100 | 95 | 105 | 101 | 101 |

FIG. 4A

| | Comparative Example 5 | Comparative Example 6 | Example 1 | Example 2 | Example 3 | Example 4 |
|---|---|---|---|---|---|---|
| W1/TDW | 0.70 | 0.70 | 0.65 | 0.90 | 0.70 | 0.70 |
| W1/W2 | 0.75 | 0.75 | 0.70 | 0.95 | 0.75 | 0.75 |
| Volume (%) of sound absorptive member with respect to tire cavity volume | 20 | 20 | 20 | 20 | 10 | 30 |
| Separation distance L1 (mm) between side reinforcing rubber and sound absorptive member | 16 | 16 | 16 | 16 | 16 | 16 |
| Density of sound absorptive member (kg/m$^3$) | 25 | 25 | 25 | 25 | 25 | 25 |
| Number of cells of sound absorptive member per 25 mm | 50 | 50 | 50 | 50 | 50 | 50 |
| End-to-end distance L2 (mm) between side reinforcing rubber and first belt ply | 10 | 10 | 10 | 10 | 10 | 10 |
| L2/W2 | 0.06 | 0.06 | 0.06 | 0.06 | 0.06 | 0.06 |
| L3/W3 | 0.04 | 0.45 | 0.10 | 0.10 | 0.10 | 0.10 |
| H1/SH (%) | 25 | 25 | 25 | 25 | 25 | 25 |
| Run-flat durability (index value) | 98 | 98 | 105 | 100 | 104 | 100 |
| Sound absorbing performance (index value) | 101 | 101 | 100 | 105 | 100 | 104 |

FIG. 4B

|  | Example 5 | Example 6 | Example 7 | Example 8 | Example 9 | Example 10 |
|---|---|---|---|---|---|---|
| W1/TDW | 0.70 | 0.70 | 0.70 | 0.70 | 0.70 | 0.75 |
| W1/W2 | 0.75 | 0.75 | 0.75 | 0.75 | 0.75 | 0.80 |
| Volume (%) of sound absorptive member with respect to tire cavity volume | 20 | 20 | 20 | 20 | 20 | 20 |
| Separation distance L1 (mm) between side reinforcing rubber and sound absorptive member | 3 | 50 | 16 | 5 | 30 | 30 |
| Density of sound absorptive member (kg/m³) | 25 | 25 | 25 | 25 | 25 | 25 |
| Number of cells of sound absorptive member per 25 mm | 50 | 50 | 50 | 50 | 50 | 50 |
| End-to-end distance L2 (mm) between side reinforcing rubber and first belt ply | 10 | 10 | 5 | 25 | 10 | 10 |
| L2/W2 | 0.06 | 0.06 | 0.03 | 0.16 | 0.06 | 0.06 |
| L3/W3 | 0.10 | 0.10 | 0.10 | 0.10 | 0.05 | 0.40 |
| H1/SH (%) | 25 | 25 | 25 | 25 | 25 | 25 |
| Run-flat durability (index value) | 103 | 102 | 103 | 103 | 102 | 102 |
| Sound absorbing performance (index value) | 102 | 103 | 103 | 103 | 104 | 105 |

FIG. 4C

PNEUMATIC TIRE

TECHNICAL FIELD

The present technology relates to a pneumatic tire having a reinforced rubber on the sidewall portion.

BACKGROUND ART

Generally, a pneumatic tire is known in which a reinforced rubber having a crescent-shaped cross-section is provided on the inner side of the sidewall portion of the tire to improve the bending rigidity of the sidewall portion. In this type of pneumatic tire, even if the air filled inside due to a puncture escapes and a large load acts on the sidewall portion, the reinforced rubber suppresses the deformation of the sidewall portion. Thus, so-called run-flat travel is possible. On the other hand, cavernous resonance occurs when a tread portion of a tire that comes into contact with a road surface when the vehicle is traveling vibrates due to the unevenness of the road surface and the vibration vibrates the air in the tire cavity portion. Since sound in a particular frequency band of the cavernous resonance is perceived as noise, it is important to reduce the level of sound pressure (noise level) in the frequency band for reducing cavernous resonance.

Therefore, in the related art, a tire has been proposed in which a sidewall portion is provided with a reinforcing rubber layer, the reinforcing rubber layer extends from the sidewall portion to at least a portion of a tread portion, the tire includes a sound damping layer made of sponge or the like, and the sound damping layer is not layered on the reinforcing rubber layer (see, for example, Japan Unexamined Patent Publication No. 2019-26019 A).

Incidentally, in a so-called run-flat tire having a reinforced rubber inside the sidewall portion, the ground contact pressure in the shoulder region of the tread portion rises during run-flat travel, and heat generation is induced. For this reason, when a sound damping layer (sound absorptive member) is provided over the inner surface of the shoulder region of the tread portion of a run-flat tire, the tire durability during the run-flat travel may decrease due to a decrease in heat dissipation of the tire or a separation or breakage of the sound damping layer. Although the conventional technology has devised a structure in which the sound damping layer and the reinforcing rubber layer are not layered, there is room for further improvement in order to improve the tire durability during run-flat travel while reducing the cavernous resonance.

SUMMARY

The present technology provides a pneumatic tire in which the tire durability during run-flat travel is improved while reducing the cavernous resonance.

A pneumatic tire according to an aspect of the present technology includes: a tread portion in which a plurality of main grooves are formed along a tire circumferential direction; a pair of sidewall portions respectively disposed on both sides of the tread portion; a pair of bead portions each disposed on an inner side in a tire radial direction of the pair of sidewall portions; a carcass layer spanning between the pair of bead portions; a belt layer disposed on an outer side in the tire radial direction of the carcass layer in the tread portion; and a reinforced rubber extending from the sidewall portion to at least a portion of the tread portion; a sound absorptive member having a band-like shape, the sound absorptive member being fixed to an inner surface of the tread portion along the tire circumferential direction, an end portion in a tire width direction of the sound absorptive member being located on an outer side in the tire width direction with respect to the main groove on an outermost side in the tire width direction, a width W1 of the sound absorptive member in the tire width direction and a tread development width TDW of the tread portion satisfying a relationship of $0.65 \leq (W1/TDW) \leq 0.90$, and the width W1 of the sound absorptive member and a belt width W2 of a belt having a maximum width in the belt layer satisfying a relationship of $0.70 \leq (W1/W2) \leq 0.95$.

In the pneumatic tire, it is preferable that a volume of the sound absorptive member is 10% or more and 30% or less with respect to a cavity volume of a tire.

In the pneumatic tire, it is preferable that in a tire meridian cross-section, an end portion on the outer side in the tire radial direction of the reinforced rubber and the end portion of the sound absorptive member are separated in the tire width direction, and a separation distance L1 is in a range of 3 mm or more and 50 mm or less.

In the pneumatic tire, it is preferable that a density of the sound absorptive member is 10 kg/m³ or more and 30 kg/m³ or less, and the number of cells of the sound absorptive member is 30 or more and 80 or less per 25 mm.

In the pneumatic tire, it is preferable that an end-to-end distance L2 between an end portion on the outer side in the tire radial direction of the reinforced rubber and an end portion of the belt in a tire meridian cross-section is 5 mm or more and 25 mm or less.

In the pneumatic tire, it is preferable that an end-to-end distance L2 between an end portion on the outer side in the tire radial direction of the reinforced rubber and an end portion of the belt and the belt width W2 of the belt in a tire meridian cross-section satisfy a relationship of $0.03 \leq (L2/W2) \leq 0.15$.

In the pneumatic tire, it is preferable that in a tire meridian cross-section, a distance L3 between a ground contact edge and an end portion on the outer side in the tire radial direction of the reinforced rubber and a ground contact width W3 of a shoulder land portion defined by the ground contact edge and the main groove on the outermost side in the tire width direction satisfy a relationship of $0.05 \leq (L3/W3) \leq 0.40$.

In the pneumatic tire, it is preferable that the bead portion includes a bead filler disposed along the carcass layer, and a height H1 of the bead filler satisfies a range of 15% or more and 50% or less of a cross-sectional height SH of a tire.

In the pneumatic tire according to the present technology, by defining the width W1 of the sound absorptive member with respect to the tread development width TDW of the tread portion and the width W1 of the sound absorptive member with respect to the belt width W2 of the belt having the maximum width, it is possible to further improve the tire durability during run-flat travel while reducing cavernous resonance.

BRIEF DESCRIPTION OF DRAWINGS

FIGS. 4A-4C include a table showing the results of performance tests of pneumatic tires according to the embodiment.

DETAILED DESCRIPTION

Embodiments of the present technology will be described in detail below with reference to the drawings. The pneumatic tire according to the present embodiment is a pneumatic tire for a vehicle, and is a run-flat tire capable of so-called run-flat travel even when the air filled inside escapes due to, for example, a puncture. However, the present technology is not limited to the embodiment. Constituents of the following embodiments include elements that can be substituted and easily conceived of by a person skilled in the art or that are essentially identical.

Figure 1:
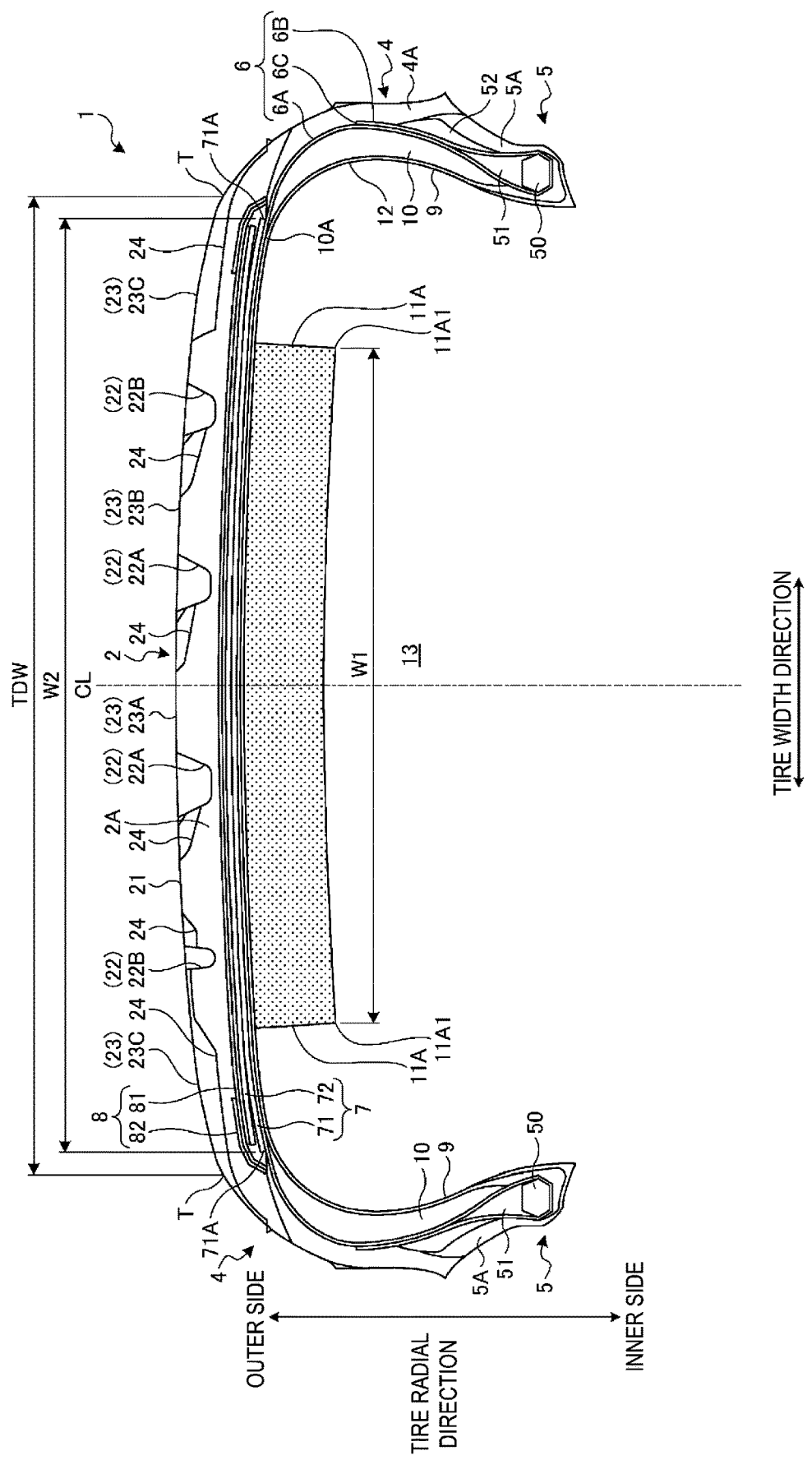
FIG. 1 is a meridian cross-sectional view illustrating a pneumatic tire according to the present embodiment.
Figure 2:
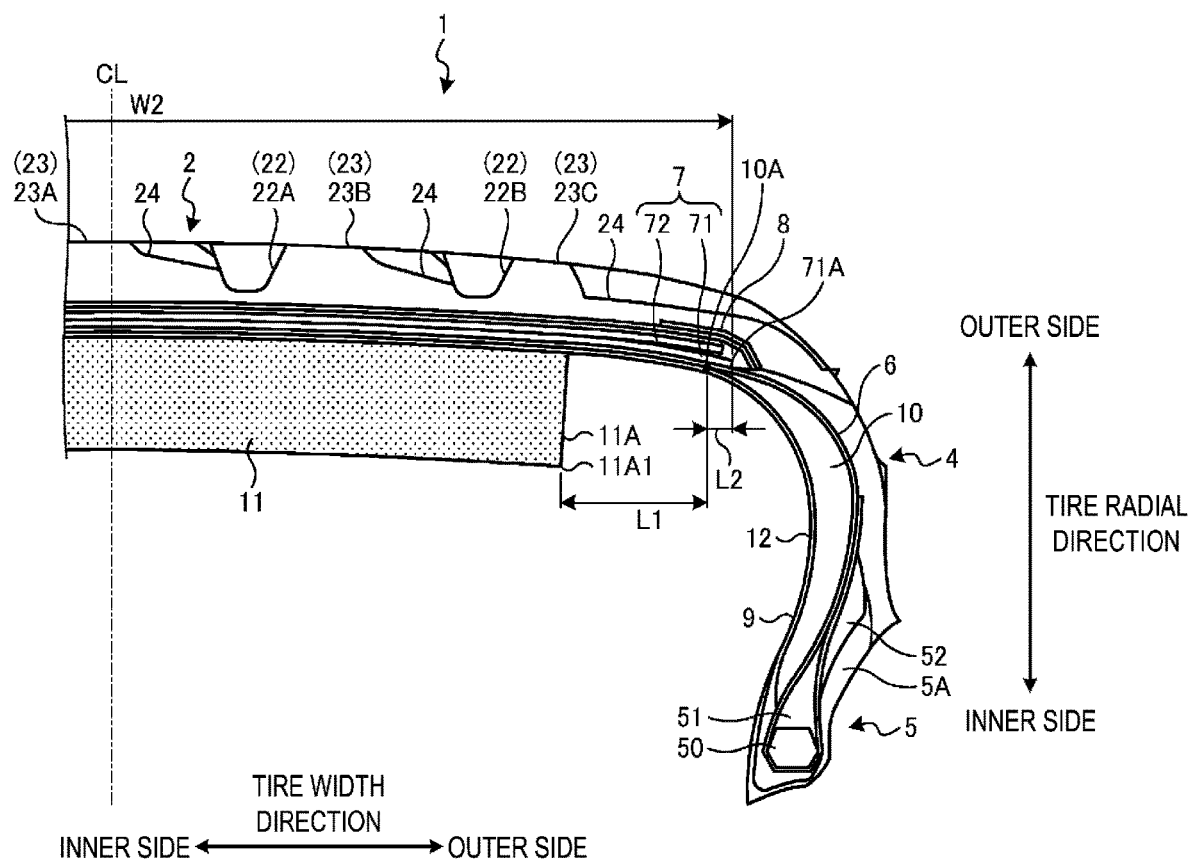
FIG. 2 is a partially enlarged cross-sectional view of FIG. 1.
Figure 3:
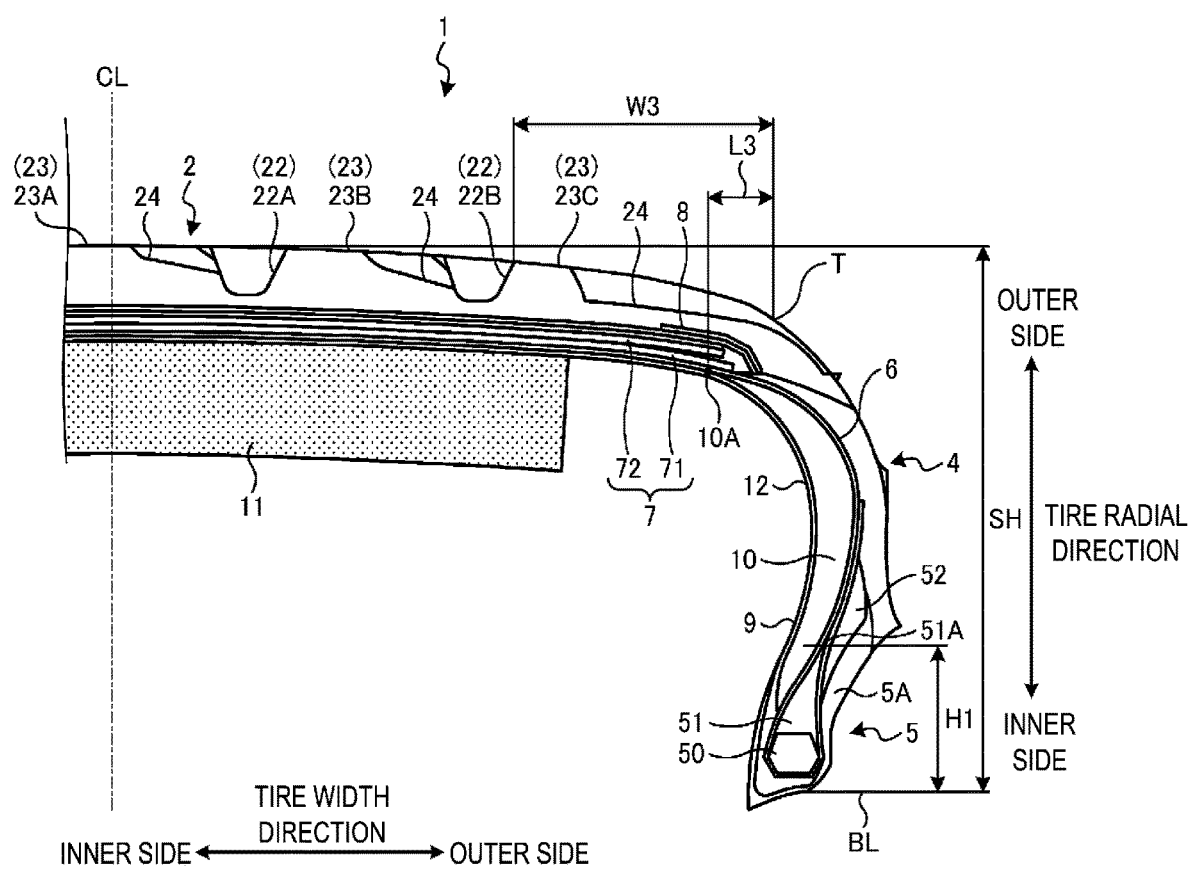
FIG. 3 is a partially enlarged cross-sectional view of FIG. 1.

FIG. 1 is a meridian cross-sectional view illustrating a pneumatic tire according to the present embodiment. FIGS. 2 and 3 are partially enlarged cross-sectional views of FIG. 1. In FIG. 1, "meridian cross-section" refers to a cross-section of the tire taken along a plane that includes a tire rotation axis (not illustrated). Further, the reference sign CL indicates a tire equatorial plane, and the tire equatorial plane refers to a plane that passes through the center point of the tire in the tire rotation axis direction and is perpendicular to the tire rotation axis. The term "tire circumferential direction" refers to a circumferential direction with the tire rotation axis as a center axis. Additionally, the tire width direction refers to a direction parallel with the tire rotation axis, the inner side in the tire width direction refers to the side toward the tire equatorial plane CL in the tire width direction, and the outer side in the tire width direction refers to the side away from the tire equatorial plane CL in the tire width direction. The tire radial direction refers to a direction perpendicular to the tire rotation axis, the inner side in the tire radial direction refers to the side toward the tire rotation axis in the tire radial direction, and the outer side in the tire radial direction refers to the side away from the tire rotation axis in the tire radial direction.

As illustrated in FIG. 1, a pneumatic tire 1 (hereinafter, simply referred to as the tire 1) according to the present embodiment has a tread portion 2 extending in the tire circumferential direction and having an annular shape, a pair of sidewall portions 4, 4 formed on both sides in the tire width direction of the tread portion 2 and extending toward the inner side in the tire radial direction, and a pair of bead portions 5, 5 disposed on the inner side in the tire radial direction of these sidewall portions 4. The tire 1 also includes a carcass layer 6, a belt layer 7, a belt cover 8, an innerliner layer 9, a side reinforcing rubber (reinforced rubber) 10, and a sound absorptive member 11.

The tread portion 2 includes a tread rubber layer 2A that is a rubber member and is exposed on the outermost side of the tire 1 in the tire radial direction. As a result, a surface 21 of the tread portion 2 forms a portion of the contour of the tire 1, and the surface 21 becomes a road contact surface (also referred to as a tread surface) that comes into contact with the road surface when the vehicle is traveling. A plurality of (four in FIG. 1) main grooves 22 extending in the tire circumferential direction are formed on the surface 21 of the tread portion 2. The main groove 22 is a groove provided with a wear indicator (not illustrated) at predetermined intervals in the tire circumferential direction. These main grooves 22 include two center main grooves 22A located on the inner side in the tire width direction with the tire equatorial plane CL interposed therebetween and two shoulder main grooves 22B located on the outer side in the tire width direction with respect to the center main groove 22A. The shoulder main groove 22B corresponds to the outermost main groove located on the outermost side in the tire width direction. In the example of FIG. 1, one of the shoulder main grooves 22B has a smaller groove width than the other shoulder main groove 22B and the center main groove 22A, but the present technology is not limited thereto, and all the main grooves 22 may have the equivalent groove width. When it is not necessary to distinguish between the center main groove 22A and the shoulder main groove 22B, it is simply referred to as the main groove 22.

The tread portion 2 is divided into a plurality of (five in FIG. 1) land portions 23 by forming the two center main grooves 22A and the two shoulder main grooves 22B. Specifically, the land portion 23 has a center land portion 23A extending in the tire circumferential direction between the pair of center main grooves 22A, 22A, a second land portion 23B extending in the tire circumferential direction between the center main groove 22A and the shoulder main groove 22B, and a shoulder land portion (shoulder region) 23C located on the outer side in the tire width direction of the shoulder main groove 22B and extending in the tire circumferential direction. When these center land portion 23A, second land portion 23B and shoulder land portion 23C are not distinguished, they are simply referred to as the land portion 23.

In the tread portion 2, a plurality of lug grooves 24 extending in a direction intersecting the tire circumferential direction is provided in each land portion 23. These lug grooves 24 may communicate with the main grooves 22. Alternatively, the lug grooves 24 may include at least one end that does not communicate with the main grooves 22 and terminates within the land portion 23.

The sidewall portions 4 are respectively disposed on both sides of the tread portion 2 in the tire width direction, and are formed so as to extend toward the inner side in the tire radial direction from the shoulder land portion 23C of the tread portion 2. Thus, the sidewall portions 4 thus formed are portions exposed on the outermost side of the tire 1 in the tire width direction, and include side rubber 4A that is a rubber material.

The bead portions 5 are disposed on the inner side of each sidewall portion 4 in the tire radial direction, and each bead portion 5 includes a bead core 50, a first bead filler 51, and a second bead filler 52. The bead core 50 is formed by winding a bead wire, which is a steel wire, into a ring shape. The first bead filler 51 and the second bead filler 52 are formed of rubber members disposed along the carcass layer 6.

The carcass layer 6 is formed by coating carcass cords made of steel or organic fibers, such as aramid, nylon, polyester, rayon, or the like with a coating rubber and performing a rolling process on it. The carcass cords of the carcass layer 6 are provided to extend along a tire meridian direction, with an inclination angle, within a predetermined range, toward the tire circumferential direction. The carcass layer 6 spans between the bead portions 5 disposed on both sides in the tire width direction in a toroidal shape, forming the framework of the tire 1. Specifically, the carcass layer 6 is disposed from one bead portion 5 to the other bead portion 5 of a pair of bead portions 5 located on both sides in the tire width direction, and both end portions of the carcass layer 6 are folded back from the inner side to the outer side in the tire width direction around the bead core 50 so as to wrap around the bead core 50 and the first bead filler 51.

Specifically, the carcass layer 6 includes: a carcass body portion 6A extending from the tread portion 2 to the bead portion 5 through the sidewall portion 4 and spanning between the pair of bead portions 5; and a folded-back portion 6B forming continuously from the carcass body portion 6A and folded back to the outer side in the tire width direction. The folded-back portion 6B is formed continuously from the carcass body portion 6A, extends from the inner side of the bead core 50 in the tire width direction to the inner side of the bead core 50 in the tire radial direction in the bead portion 5, is folded back toward the outer side of the bead core 50 in the tire width direction, and is overlapped on the carcass body portion 6A on the outer side of the bead core 50 and the first bead filler 51 in the tire radial direction. The folded-back portion 6B has an end portion 6C in the tire radial direction positioned more on the outer side in the tire radial direction than the first bead filler 51. Thus, the folded-back portion 6B is provided to extend from the bead portion 5 toward the sidewall portion 4 and cover the entirety of the first bead filler 51.

The first bead filler 51 of the bead portion 5 is disposed on the inner side of the folded-back portion 6B of the carcass layer 6 in the tire width direction and on the outer side of the bead core 50 in the tire radial direction. In other words, the first bead filler 51 has a substantially triangular cross-sectional shape by being disposed on the outer side of the bead core 50 in the tire radial direction, in a portion defined by the carcass body portion 6A and the folded-back portion 6B of the carcass layer 6 and the bead core 50, in a tire meridian cross-section.

The second bead filler 52 is disposed along the carcass layer 6 on the outer side of the folded-back portion 6B of the carcass layer 6 in the tire width direction. Thus, the second bead filler 52 is sandwiched between the folded-back portion 6B of the carcass layer 6 and the side rubber 4A in the tire width direction.

The bead portions 5 each include a rim cushion rubber 5A that is a rubber member exposed at a portion on the tire outer side that comes into contact with a rim (not illustrated). The rim cushion rubber 5A forms an outer circumference of the bead portion 5, extends over the inner side in the tire radial direction to be in contact with the rim from the inner side of the bead portion 5 in the tire width direction, and is disposed to cover a part of a portion of the second bead filler 52 on the inner side in the tire radial direction disposed on the outer side of the carcass layer 6 in the tire width direction.

The belt layer 7 is formed by layering a plurality of belt plies in the tire radial direction, and is disposed on the outer side in the tire radial direction of the carcass layer 6. In the present embodiment, the belt layer 7 has two layers, a first belt ply 71 and a second belt ply 72. The first belt ply 71 is located on the inner side in the tire radial direction with respect to the second belt ply 72, and is formed so as to have the maximum width in the tire width direction in the belt layer 7. The belt plies 71 and 72 are made by covering a plurality of belt cords made from steel or an organic fiber material with coating rubber and performing a rolling process on it, and a belt angle defined as an inclination angle in extension directions of the belt cords toward the tire width direction with respect to the tire circumferential direction is within a range of 20° or more and 35° or less. The belt plies 71 and 72 are configured as a so-called crossply structure, by being layered with the extension directions of the belt cords intersecting with one another, with their belt angles having opposite signs. Thus, inclination directions of the belt cords of the belt plies 71 and 72, toward the tire width direction with respect to the tire circumferential direction, are opposite to each other.

The belt cover 8 is disposed on the outer side in the tire radial direction of the belt layer 7. The belt cover 8 is made by performing a rolling process on a plurality of cords covered with coating rubber and made from steel or an organic fiber material. The belt angle of the belt cover 8 toward the tire width direction with respect to the tire circumferential direction is within a range of ±5°. The belt cover 8 is disposed in a layered manner on the outer side in the tire radial direction of the belt layer 7 and is disposed at least in a range where the belt plies 71 and 72 of the belt layer 7 are disposed in the tire width direction. In the present embodiment, the belt cover 8 includes: a belt full cover 81 that entirely covers the belt layer 7; and a belt edge cover 82 that covers the end portion of the belt layer 7 in the tire width direction.

The innerliner layer 9 is an air permeation preventing layer that is disposed on a tire inner surface 12, which is a surface of the tire 1 on the tire inner side, to cover the carcass layer 6. The innerliner layer 9 prevents leakage of air filled in the tire 1 and suppresses oxidation due to exposure of the carcass layer 6. Specifically, the innerliner layer 9 is disposed on the tire inner surface 12 side of the carcass layer 6 and has both end portions in the tire width direction reaching the positions of the pair of bead portions 5, where the innerliner layer 9 is rolled in the tire circumferential direction in a toroidal shape.

The side reinforcing rubber 10 is a rubber member provided inside the sidewall portion 4 and is disposed without being exposed on the tire inner surface 12 or a surface on the tire outer side of the tire 1. Specifically, the side reinforcing rubber 10 is located mainly on the inner side in the tire width direction of each of the portions of the carcass layer 6 located at the sidewall portions 4 and is disposed between the carcass layer 6 and the innerliner layer 9 in the sidewall portion 4. That is, the side reinforcing rubber 10 is disposed on the tire inner surface 12 side of the carcass layer 6 in a portion of the tread portion 2 (the shoulder land portion 23C) from the sidewall portion 4.

In the tire meridian cross-section, the side reinforcing rubber 10 is formed in a crescent shape projecting to the outer side in the tire width direction. The side reinforcing rubber 10 is formed of a rubber material that has a strength greater than that of the side rubber 4A forming the sidewall portions 4 or that of the rim cushion rubber 5A forming the bead portions 5.

The sound absorptive member 11 is fixed to the region of the tire inner surface 12 corresponding to the tread portion 2 across the tire equatorial plane CL. For fixing the sound absorptive member 11, for example, an adhesive or double-sided adhesive tape can be used. The sound absorptive member 11 is made of a porous material with open cells and has predetermined sound absorbing properties based on the porous structure. Polyurethane foam may be used as the porous material of the sound absorptive member 11, and it is desirable that it does not contain water repellent. In the example of FIG. 1, the sound absorptive member 11 is formed of a single band-like body having a rectangular cross-sectional shape and extending in the tire circumferential direction.

The density of the sound absorptive member 11 is 10 kg/m$^3$ or more and 30 kg/m$^3$, and the number of cells (air bubbles) of the sound absorptive member 11 is preferably 30 or more and 80 or less per 25 mm (1 inch). The density of the sound absorptive member 11 is set as such to give the sound absorptive member 11 a low density and reduce weight. This leads to a reduction in rolling resistance. Additionally, the number of cells of the sound absorptive member 11 is appropriately set, and thus fine air bubbles can be formed. This ensures a sufficient sound absorbing effect of the sound absorptive member 11.

The volume of the sound absorptive member 11 is preferably 10% or more and 30% or less with respect to the volume (cavity volume) of a tire cavity portion 13 formed between the tire 1 and a rim (not illustrated). Thus, the sound absorbing effect of the sound absorptive member 11 can be sufficiently ensured, which leads to an improvement in quietness. When the volume of the sound absorptive member 11 is less than 10% of the cavity volume of the tire 1, the sound absorbing effect cannot be appropriately obtained. Additionally, when the volume of the sound absorptive member 11 to the cavity volume of the tire 1 is greater than 30%, the noise reduction effect due to cavernous resonance plateaus. As a result, the noise reduction effect cannot be further obtained. For example, the volume of the sound absorptive member can be 21% or more and 30% or less with respect to the cavity volume of the pneumatic tire.

Although not illustrated, the sound absorptive member 11 preferably has a missing portion at at least one position in the tire circumferential direction. This missing portion is a portion on the tire inner surface (inner circumferential surface) 12 corresponding to the tread portion 2 where the sound absorptive member 11 does not exist. The missing portion is provided in the sound absorptive member 11. This allows for expansion due to inflation of the tire 1 or shear strain of an adhering surface due to contact and rolling of the tire 1 to be endured for a long period of time and for shear strain at the adhering surface of the sound absorptive member 11 to be effectively alleviated.

When the sound absorptive member 11 is adhered, the total thickness of the adhesive or the double-sided adhesive tape (referred to as an adhesive and the like) is preferably 10 µm or more and 150 µm or less. By defining the total thickness of these adhesives and the like to the above-described range, it is possible to ensure the followability to the deformation of the tread portion 2. Here, if the total thickness of the adhesive and the like is less than 10 µm, the strength of the adhesive and the like is insufficient and the adhesiveness of the sound absorptive member 11 to the tread portion 2 cannot be sufficiently ensured. Further, if the total thickness of the adhesive and the like exceeds 150 µm, heat dissipation is hindered during high-speed travel, so that high-speed durability deteriorates. The density of the sound absorptive member 11 and the number of cells of the sound absorptive member 11 are measured in accordance with JIS-K6400. Note that the dimensions and the cavity volume of the tire 1 are measured in a state where the tire is mounted on a regular rim and inflated to the regular internal pressure. In particular, the cavity volume of the tire is the volume of a cavity portion formed between the tire and the rim in the condition described above.

In the tire 1 described above, as illustrated in FIG. 1, the sound absorptive member 11 is provided such that an end portion 11A located on the outer side in the tire width radial direction is located on the outer side in the tire width direction with respect to the shoulder main groove 22B located on the outermost side in the tire width direction. The end portion 11A of the sound absorptive member 11 is located on the inner side in the tire width direction with respect to a ground contact edge T of the tread portion 2. As described above, the end portion 11A of the sound absorptive member 11 is located between the shoulder main groove 22B and the ground contact edge T in the tire width direction, that is, on the tire inner surface 12 corresponding to the shoulder land portion 23C of the tread portion 2.

Specifically, in the sound absorptive member 11, a width W1 of the sound absorptive member 11 in the tire width direction and a tread development width TDW of the tread portion 2 satisfy a relationship of $0.65 \leq (W1/TDW) \leq 0.90$. Here, the tread development width TDW is the distance between the ground contact edges T, T on the outer side in the tire width direction of the two shoulder land portions 23C, and refers to the linear distance between the ground contact edges T, T in a developed view of the tread portion 2 of the tire 1 in a state (reference state) in which the tire 1 is mounted on a regular rim and inflated to a specified internal pressure, and no load is applied. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The width W1 of the sound absorptive member 11 refers to the linear distance between the end portions 11A, 11A in the reference state, and more specifically, refers to the linear distance between corner portions 11A1, 11A1 on the inner side in the tire radial direction of the sound absorptive member 11.

According to this configuration, since the size of the sound absorptive member 11 in the tire width direction can be appropriately defined, the cavernous resonance generated in the tire cavity portion 13 can be reduced. Further, since it is possible to avoid the sound absorptive member 11 from being disposed on the tire inner surface 12 corresponding to the shoulder land portion 23C (shoulder region) of the tread portion 2, heat dissipation of the tire can be improved and a decrease in the tire durability during run-flat travel can be suppressed. When the W1/TDW is less than 0.65, the width W1 of the sound absorptive member 11 with respect to the tread development width TDW is small, and the sound absorbing effect cannot be appropriately obtained. Further, when W1/TDW is larger than 0.90, the amount of overlap of the sound absorptive member 11 with respect to the shoulder land portion 23C becomes large, and the heat dissipation of the tire decreases, so that the tire durability during run-flat travel decreases. In this configuration, since the width W1 of the sound absorptive member 11 and the tread development width TDW of the tread portion 2 satisfy the range of $0.65 \leq (W1/TDW) \leq 0.90$, a decrease in tire durability during run-flat travel can be suppressed while reducing the cavernous resonance in the tire cavity portion 13.

In the tire 1 described above, a belt width W2 of the first belt ply 71 having the maximum width in the belt layer 7 is formed to be smaller than the tread development width TDW. The belt width W2 of the first belt ply 71 refers to the linear distance between end portions 71A, 71A in the reference state. Further, it is preferable that the width W1 of the sound absorptive member 11 and the belt width W2 of the first belt ply 71 having the maximum width in the belt layer 7 satisfy a relationship of $0.70 \leq (W1/W2) \leq 0.95$. Here, when W1/W2 is less than 0.70, the width W1 of the sound absorptive member 11 with respect to the belt width W2 of the first belt ply 71 is small, and the sound absorbing effect cannot be appropriately obtained. Further, when W1/W2 is larger than 0.95, the amount of overlap of the sound absorptive member 11 with respect to the first belt ply 71 (belt layer 7) becomes large, and the heat dissipation of the tire is lowered, so that the tire durability during run-flat travel is reduced. In this configuration, the belt width W2 of the first belt ply 71 is formed to be smaller than the tread development width TDW, and the width W1 of the sound absorptive member 11 and the belt width W2 of the first belt ply 71 satisfy the relationship of $0.70 \leq (W1/W2) \leq 0.95$. Thus, the relationship between the tread development width TDW, the width W1 of the sound absorptive member 11 and the belt width W2 of the first belt ply 71 can be appropriately defined, and a decrease in the tire durability during run-flat travel can be suppressed while reducing cavernous resonance generated in the tire cavity portion 13.

In the tire 1 described above, as illustrated in FIG. 2, the side reinforcing rubber 10 formed in a crescent shape in the tire meridian cross-section is preferably configured such that the end portion 10A on the outer side in the tire radial direction and the end portion 11A of the sound absorptive member 11 are separated in the tire width direction, and a separation distance L1 is in the range of 3 mm or more and 50 mm or less. This distance L1 is the linear distance in the tire width direction when auxiliary lines along the tire radial direction are respectively extended from the corner portion 11A1 on the inner side in the tire radial direction of the sound absorptive member 11 and the end portion 10A on the outer side in the tire radial direction of the side reinforcing rubber 10 in the reference state. For example, the separation distance L1 can be in the range of 32 mm or more and 50 mm or less.

When the separation distance L1 is less than 3 mm, the side reinforcing rubber 10 and the sound absorptive member 11 come too close to each other, and the heat dissipation of the tire is lowered, so that the tire durability during run-flat travel is lowered. Further, when the separation distance L1 is larger than 50 mm, the size of the sound absorptive member 11 in the tire width direction becomes relatively small, so that the sound absorbing effect cannot be appropriately obtained. In this configuration, since the separation distance L1 between the side reinforcing rubber 10 and the sound absorptive member 11 is in the range of 3 mm or more and 50 mm or less, it is possible to suppress a decrease in the tire durability during run-flat travel while reducing the cavernous resonance generated in the tire cavity portion 13. The separation distance L1 is more preferably 16 mm or more and 30 mm or less.

In the tire 1 described above, an end-to-end distance L2 between the end portion 10A on the outer side in the tire radial direction of the side reinforcing rubber 10 formed in a crescent shape in the tire meridian cross-section and the end portion 71A of the first belt ply 71 is preferably 5 mm or more and 25 mm or less. In the reference state, the end-to-end distance L2 is the linear distance in the tire width direction when auxiliary lines along the tire radial direction are respectively extended from the end portion 10A on the outer side in the tire radial direction of the side reinforcing rubber 10 and the end portion 71A of the first belt ply 71 in the reference state. In this configuration, the end portion 10A of the side reinforcing rubber 10 is located on the inner side in the tire width direction with respect to the end portion 71A of the first belt ply 71, and the side reinforcing rubber 10 and the first belt ply 71 overlap in the tire width direction. Here, when the end-to-end distance L2 is less than 5 mm, the amount of overlap between the side reinforcing rubber 10 and the first belt ply 71 is small, and the distance between the end portion 71A of the first belt ply 71 and the end portion 10A of the side reinforcing rubber 10 becomes small. Thus, there is a problem that a failure is likely to occur due to stress concentration. Further, if the end-to-end distance L2 between the side reinforcing rubber 10 and the first belt ply 71 is larger than 25 mm, the overlap amount becomes large, and rather the heat dissipation of the tire 1 decreases. Thus, the durability performance of the tire 1 during run-flat travel decreases. In this configuration, the end-to-end distance L2 between the end portion 10A on the outer side in the tire radial direction of the side reinforcing rubber 10 and the end portion 71A of the first belt ply 71 overlapping in the tire width direction is 5 mm or more and 25 mm or less. As a result, it is possible to suppress a decrease in heat dissipation of the tire 1 while avoiding stress concentration due to the overlap between the end portion 71A of the first belt ply 71 and the end portion 10A of the side reinforcing rubber 10, and thus, the occurrence of a failure in the tire 1 can be avoided.

Further, it is preferable that the end-to-end distance L2 and the belt width W2 of the first belt ply 71 satisfy the relationship of $0.03 \leq (L2/W2) \leq 0.15$. In a state in which the side reinforcing rubber 10 and the first belt ply 71 overlap in the tire width direction, when the relationship L2/W2 between the end-to-end distance L2 (overlap amount) between the side reinforcing rubber 10 and the first belt ply 71 and the belt width W2 of the first belt ply 71 is less than a, the amount of overlap with respect to the belt width W2 is small, and the distance between the end portion 71A of the first belt ply 71 and the end portion 10A of the side reinforcing rubber 10 becomes small. Thus, there is a problem that a failure is likely to occur due to stress concentration. Further, when the L2/W2 is larger than 0.15, the amount of overlap with respect to the belt width W2 becomes large, which may increase the possibility of leading to a tire failure. Moreover, there is a problem that it is necessary to decrease the width W1 of the sound absorptive member 11 in order to ensure the distance L1 between the side reinforcing rubber 10 and the sound absorptive member 11 and a desired noise reduction effect cannot be obtained. In this configuration, the end-to-end distance L2 between the end portion 10A on the outer side in the tire radial direction of the side reinforcing rubber 10 and the end portion 71A of the first belt ply 71 and the belt width W2 of the first belt ply 71 satisfy the relationship of $0.03 \leq (L2/W2) \leq 0.15$. As a result, it is possible to appropriately set the overlap amount with respect to the belt width W2 and the distance L1 between the side reinforcing rubber 10 and the sound absorptive member 11. Therefore, both tire durability and noise reduction effect can be provided in a compatible manner.

In the tire 1 described above, as illustrated in FIG. 3, it is preferable that a distance L3 between the ground contact edge T and the end portion 10A on the outer side in the tire radial direction of the side reinforcing rubber 10 formed in a crescent shape in the tire meridian cross-section and a ground contact width W3 of the shoulder land portion 23C partitioned by the ground contact edge T and the shoulder main groove 22B (outermost main groove) is in the range satisfying $0.05 \leq (L3/W3) \leq 0.40$. The end portion 10A of the side reinforcing rubber 10 is located on the inner side in the tire width direction with respect to the ground contact edge T. The distance L3 is the linear distance in the tire width direction when auxiliary lines along the tire radial direction are respectively extended from the end portion 10A on the outer side in the tire radial direction of the side reinforcing rubber 10 and the ground contact edge T in the reference state. The ground contact width W3 is the linear distance in the tire width direction between the ground contact edge T and the outer side edge of the shoulder main groove 22B in the reference state.

Here, when L3/W3 is less than 0.05, the amount of overlap of the side reinforcing rubber 10 with respect to the shoulder land portion 23C becomes small. As a result, the end-to-end distance L2 between the side reinforcing rubber 10 and the first belt ply 71 becomes small, and thus, the durability of the tire 1 during run-flat travel decreases due to stress concentration. Further, when L3/W3 is larger than 0.40, the amount of overlap of the side reinforcing rubber 10 with respect to the shoulder land portion 23C becomes large, and the heat dissipation of the tire decreases, so that the tire durability during run-flat travel decreases. In this configuration, the distance L3 between the end portion 10A of the side reinforcing rubber 10 and the ground contact edge T and the ground contact width W3 of the shoulder land portion 23C satisfy the relationship of $0.05 \leq (L3/W3) \leq 0.40$. Therefore, the positional relationship of the end portion 10A of the side reinforcing rubber 10 with respect to the shoulder land portion 23C can be appropriately defined, and a decrease in tire durability during run-flat travel can be suppressed.

Incidentally, the tire 1 according to the present embodiment has the side reinforcing rubber 10 provided in the sidewall portion 4 as described above. Thus, run-flat travel can be performed. On the other hand, since the rubber material forming the side reinforcing rubber 10 has higher strength than the rubber material forming the side rubber 4A, the rigidity of the sidewall portion 4 in the tire radial direction may become too high. In case of the sidewall portion 4 having an excessively high rigidity in the tire radial direction, the sidewall portion 4 is difficult to deflect in the tire radial direction under normal travel conditions with the tire 1 filled with air inside, and thus the ride comfort might be likely to be compromised.

Therefore, in this configuration, an excessive increase in the rigidity of the sidewall portion 4 and the bead portion 5 in the tire radial direction is suppressed by adjusting a first bead filler height (bead filler height) H1 of the bead portion 5 with respect to a tire cross-sectional height SH. Here, the tire cross-sectional height SH is the distance in the tire radial direction between a rim diameter reference position BL and the portion of the tread portion 2 that is located on the outermost side in the tire radial direction in the above-mentioned reference state. The rim diameter reference position BL is a line in the tire axial direction that passes through the rim diameter defined by the JATMA standard. The first bead filler height (bead filler height) H1 refers to the height in the tire radial direction from the rim diameter reference position BL to an outer end portion 51A of the first bead filler 51.

Specifically, the first bead filler height H1 is within a range of 15% or more and 50% or less of the tire cross-sectional height SH, whereby the rigidity of the bead portion 5 can be more reliably ensured. When the first bead filler height H1 is less than 15% of the tire cross-sectional height SH, the first bead filler height H1 is excessively low, and it might be difficult to ensure the rigidity of the first bead filler 51. In this case, it might be difficult to ensure the rigidity of the bead portion 5, and it might be difficult to ensure the rigidity during the run-flat travel. Further, when the first bead filler height H1 is larger than 50% of the tire cross-sectional height SH, the rigidity of the sidewall portion 4 in the tire radial direction may become too high, and the sidewall portion 4 is less likely to deflect in the tire radial direction under normal travel conditions with the tire 1 filled with air inside. Thus, the ride comfort might be likely to deteriorate. In this configuration, since the first bead filler height H1 is 15% or more and 50% or less of the tire cross-sectional height SH, the rigidity of the first bead filler 51 can be more reliably ensured, and more appropriate rigidity of the bead portion 5 can be ensured. For this reason, it is possible to suppress an excessive increase in the rigidity in the tire radial direction under normal travel conditions with the tire 1 filled with air inside and improve the ride comfort while ensuring the rigidity in the tire radial direction during run-flat travel.

As described above, the pneumatic tire 1 according to the present embodiment includes: the tread portion 2 in which the plurality of main grooves 22 are formed along the tire circumferential direction; the pair of sidewall portions 4 disposed on both sides of the tread portion 2; the pair of bead portions 5 disposed on the inner side in the tire radial direction of the sidewall portion 4; the carcass layer 6 spanning between the pair of bead portions 5; the belt layer 7 disposed on the outer side in the tire radial direction of the carcass layer 6 in the tread portion 2; and the side reinforcing rubber 10 extending from the sidewall portion 4 to at least a portion of the tread portion 2. The band-like sound absorptive member 11 is fixed to the tire inner surface 12 of the tread portion 2 along the tire circumferential direction. The end portion 11A in the tire width direction of the sound absorptive member 11 is located on the outer side in the tire width direction with respect to the outermost shoulder main groove 22B in the tire width direction. The width W1 of the sound absorptive member 11 and the tread development width TDW of the tread portion 2 in the tire width direction satisfy the relationship of $0.65 \leq (W1/TDW) \leq 0.90$. The width W1 of the sound absorptive member 11 and the belt width W2 of the first belt ply 71 having the maximum width of the belt layer 7 satisfy the relationship of $0.70 \leq (W1/W2) \leq 0.95$. Therefore, the relationship between the tread development width TDW, the width W1 of the sound absorptive member 11, and the belt width W2 of the first belt ply 71 can be appropriately defined, and a decrease in the tire durability during run-flat travel can be suppressed while reducing the cavernous resonance generated in the tire cavity portion 13.

Further, according to the present embodiment, the volume of the sound absorptive member 11 is 10% or more and 30% or less with respect to the cavity volume of the tire 1. Thus, it is possible to sufficiently ensure the sound absorbing effect of the sound absorptive member 11 and improve the quietness.

Further, according to the present embodiment, in the tire meridian cross-section, the end portion 10A on the outer side in the tire radial direction of the side reinforcing rubber 10 and the end portion 11A of the sound absorptive member 11 are separated in the tire width direction, and the separation distance L1 is in the range of 3 mm or more and 50 mm or less. Thus, it is possible to suppress a decrease in the tire durability during run-flat travel while reducing the cavernous resonance generated in the tire cavity portion 13.

Further, according to the present embodiment, the density of the sound absorptive member 11 is 10 kg/m$^3$ or more and 30 kg/m$^3$ or less, and the number of cells of the sound absorptive member 11 is 30 or more and 80 or less per 25 mm. Thus, by setting the density of the sound absorptive member 11, the sound absorptive member 11 has a low density and can be reduced in weight, which leads to a reduction in rolling resistance. Additionally, the number of cells of the sound absorptive member 11 is appropriately set, and thus fine air bubbles can be formed. This ensures a sufficient sound absorbing effect of the sound absorptive member 11.

Further, according to the present embodiment, in the tire meridian cross-section, the end-to-end distance L2 between the end portion 10A on the outer side in the tire radial direction of the side reinforcing rubber 10 and the end portion 71A of the first belt ply 71 is 5 mm or more and 25 mm or less. Therefore, it is possible to suppress a decrease in heat dissipation of the tire 1 while avoiding stress concentration due to the overlap between the end portion 71A of the first belt ply 71 and the end portion 10A of the side reinforcing rubber 10. Thus, it is possible to avoid the occurrence of a failure in the tire 1.

Further, according to the present embodiment, in the tire meridian cross-section, the end-to-end distance L2 between the end portion 10A on the outer side in the tire radial direction of the side reinforcing rubber 10 and the end portion 71A of the first belt ply 71, and the belt width W2 of the first belt ply 71 satisfy the relationship of 0.03≤(L2/W2)≤0.15. Therefore, the overlap amount with respect to the belt width W2, and the distance L1 between the side reinforcing rubber 10 and the sound absorptive member 11 can be set appropriately. Thus, both tire durability and noise reduction effect can be provided in a compatible manner.

Further, according to the present embodiment, in the tire meridian cross-section, the distance L3 between the ground contact edge T and the end portion 10A on the outer side in the tire radial direction of the side reinforcing rubber 10 and the ground contact width W3 of the shoulder land portion 23C defined by the ground contact edge T and the shoulder main groove 22B satisfy the relationship of 0.05≤(L3/W3)≤0.40. Therefore, the positional relationship of the end portion 10A of the side reinforcing rubber 10 with respect to the shoulder land portion 23C can be appropriately defined, and a decrease in tire durability during run-flat travel can be suppressed.

Further, according to the present embodiment, the bead portion 5 includes the first bead filler 51 disposed along the carcass layer 6, and the height H1 of the first bead filler 51 satisfies the range of 15% or more and 50% or less of the tire cross-sectional height SH. Therefore, the rigidity of the first bead filler 51 can be more reliably ensured, and more appropriate rigidity of the bead portion 5 can be ensured. For this reason, it is possible to suppress an excessive increase in the rigidity in the tire radial direction under normal travel conditions with the tire 1 filled with air inside and improve the ride comfort while ensuring the rigidity in the tire radial direction during run-flat travel.

EXAMPLES

FIGS. 4A-4C include a table showing the results of performance tests of pneumatic tires according to the present embodiment. In this performance test, the durability during run-flat travel and sound absorbing performance were evaluated for a plurality of types of test tires. The test tires of Examples 1 to 10 and Comparative Examples 1 to 6 illustrated in FIGS. 4A-4C were manufactured in which the test tires include the sound absorptive member 11 on the tire inner surface 12 of the tread portion 2, and the relationship W1/TDW between the width W1 of the sound absorptive member 11 and the tread development width TDW, the relationship W1/W2 between the width W1 of the sound absorptive member 11 and the belt width W2 of the first belt ply 71, the separation distance L1 between the side reinforcing rubber 10 and the sound absorptive member 11, the end-to-end distance L2 between the side reinforcing rubber 10 and the first belt ply 71, the relationship L1/W2 between the end-to-end distance L2 and the belt width W2 of the first belt ply 71, and the relationship L3/W3 between the distance L3 between the side reinforcing rubber 10 and the ground contact edge T and the ground contact width W3 of the shoulder land portion 23C are changed. For comparison, Conventional Example 1 (JP 2019-26019 A) provided with a sound damping layer (sound absorptive member) and side reinforcing rubber was prepared. The end-to-end distance L2 is an end-to-end distance in a state where the side reinforcing rubber 10 and the first belt ply 71 overlap each other in the tire width direction.

The test tires had a tire size of 245/40RF18 93Y, and the durability during run-flat travel and sound absorbing performance during run-flat travel were evaluated for these test tires by the following test method, and the results are also shown in FIGS. 4A-4C. The run-flat durability evaluation test was conducted such that the test tire was mounted on a rim wheel with a rim size of 18×7.5 J, the air pressure was adjusted to 230 kPa, the test tire was mounted on a test vehicle of a four-wheel drive passenger car having an engine displacement of 2.0 L, and test driving was performed. In this evaluation test, the distance traveled until the test driver felt vibration due to a tire failure was measured when the air pressure of the right-front wheel of the test tires mounted to the test vehicle was set to 0 kPa and the vehicle traveled at an average speed of 80 km/h on a test course of a dry road surface. The measured travel distance was displayed as an index value with Conventional Example 1 as 100. The durability during run-flat travel indicates that the larger this value, the longer the distance traveled until the test driver felt vibration, and the less likely it is that a tire failure will occur when running at an air pressure of 0 kPa. In the sound absorbing performance evaluation test, each test tire was mounted on a rim wheel with a rim size of 18×7.5 J, the air pressure was adjusted to 230 kPa, the tire was mounted on a test vehicle of a four-wheel drive passenger car with an engine displacement of 2.0 L, the vehicle traveled at an average speed of 50 km/h on a test course of an asphalt road surface, the sound pressure level of the noise collected by a microphone installed near the driver's seat window was measured. The reciprocal of this measured value was displayed as an index value with Conventional Example 1 as 100. The sound absorbing performance indicates that the larger this value, the larger the reduction of the cavernous resonance and the better the sound absorbing performance.

As can be seen from FIGS. 4A-4C, the tires of Examples 1 to 10 were able to realize the improvement in the durability during run-flat travel and sound absorbing performance in comparison with Conventional Example 1. On the other hand, since the tires of Comparative Examples 1 to 6 did not satisfy the predetermined conditions, the effects of achieving improvement in both durability during run-flat travel and sound absorbing performance in a compatible manner could not be sufficiently obtained.

While the embodiments of the present technology have been described above, the present technology is not limited to the embodiments described above. For example, a gas to be filled in the pneumatic tire illustrated in the present embodiment may be an inert gas such as nitrogen, argon, and helium in addition to ordinary air or air with an adjusted oxygen partial pressure.

The invention claimed is:

1. A pneumatic tire, comprising:
    a tread portion in which a plurality of main grooves are formed along a tire circumferential direction;
    a pair of sidewall portions respectively disposed on both sides of the tread portion;
    a pair of bead portions each disposed on an inner side in a tire radial direction of the respective one of the pair of sidewall portions;
    a carcass layer spanning between the pair of bead portions;
    a belt layer comprising at least one belt and disposed on an outer side in the tire radial direction of the carcass layer in the tread portion, each having a belt cord inclination angle with respect to the tire circumferential direction within a range of 20° or more and 35° or less; and a run-flat reinforced rubber extending from each sidewall portion to at least a portion of the tread portion;

a sound absorptive member having a band shape, the sound absorptive member being fixed to an inner surface of the tread portion along the tire circumferential direction, a respective end portion in a tire width direction of the sound absorptive member being located on an outer side in the tire width direction with respect to the respective main groove on an outermost side in the tire width direction, a width W1 of the sound absorptive member in the tire width direction and a tread development width TDW of the tread portion between tread ground contact edges T satisfying a relationship of 0.65≤ (W1/TDW)≤0.90, and the width W1 of the sound absorptive member and a belt width W2 in the tire width direction of a belt having a maximum width in the belt layer satisfying a relationship of 0.70≤ (W1/W2)≤0.95, wherein in a tire meridian cross-section, an outermost end portion on the outer side in the tire radial direction of the respective run-flat reinforced rubber and the respective end portion of the sound absorptive member are separated in the tire width direction by a separation distance L1, and the separation distance L1 is in a range of 16 mm or more and 50 mm or less.

2. The pneumatic tire according to claim 1, wherein a volume of the sound absorptive member is 10% or more and 30% or less with respect to a cavity volume of the pneumatic tire.

3. The pneumatic tire according to claim 2, wherein
the sound absorptive member is made of a porous material with open cells,
a density of the sound absorptive member is 10 kg/m$^3$ or more and 30 kg/m$^3$ or less, and
the number of cells of the sound absorptive member is 30 or more and 80 or less per 25 mm.

4. The pneumatic tire according to claim 3, wherein an end-to-end distance L2 in the tire width direction between the outermost end portion on the outer side in the tire radial direction of the respective run-flat reinforced rubber and a respective outermost end portion of the belt having a maximum width in the belt layer in a tire meridian cross-section is 5 mm or more and 25 mm or less.

5. The pneumatic tire according to claim 3, wherein an end-to-end distance L2 in the tire width direction between the outermost end portion on the outer side in the tire radial direction of the respective run-flat reinforced rubber and a respective outermost end portion of the belt having a maximum width in the belt layer and the belt width W2 of the belt in a tire meridian cross-section satisfy a relationship of 0.03≤ (L2/W2)≤0.15.

6. The pneumatic tire according to claim 5, wherein, in a tire meridian cross-section, a distance L3 in the tire width direction between the respective tread ground contact edge T and the outermost end portion on the outer side in the tire radial direction of the respective run-flat reinforced rubber and a ground contact width W3 in the tire width direction of a shoulder land portion defined by the respective tread ground contact edge T and the respective main groove on the outermost side in the tire width direction satisfy a relationship of 0.05≤ (L3/W3)≤0.40.

7. The pneumatic tire according to claim 6, wherein the respective bead portion comprises a bead core and a bead filler disposed along the carcass layer on an outer side of the bead core in the tire radial direction, and a height H1 of the respective bead filler in the tire radial direction satisfies a range of 15% or more and 50% or less of a cross-sectional height SH of the pneumatic tire.

8. The pneumatic tire according to claim 1, wherein
the sound absorptive member is made of a porous material with open cells,
a density of the sound absorptive member is 10 kg/m$^3$ or more and 30 kg/m$^3$ or less, and
the number of cells of the sound absorptive member is 30 or more and 80 or less per 25 mm.

9. The pneumatic tire according to claim 1, wherein an end-to-end distance L2 in the tire width direction between the outermost end portion on the outer side in the tire radial direction of the respective run-flat reinforced rubber and a respective outermost end portion of the belt having a maximum width in the belt layer in a tire meridian cross-section is 5 mm or more and 25 mm or less.

10. The pneumatic tire according to claim 1, wherein an end-to-end distance L2 in the tire width direction between the outermost end portion on the outer side in the tire radial direction of the respective run-flat reinforced rubber and a respective outermost end portion of the belt having a maximum width in the belt layer and the belt width W2 of the belt in a tire meridian cross-section satisfy a relationship of 0.03≤ (L2/W2)≤0.15.

11. The pneumatic tire according to claim 1, wherein, in a tire meridian cross-section, a distance L3 in the tire width direction between the respective tread ground contact edge T and the outermost end portion on the outer side in the tire radial direction of the respective run-flat reinforced rubber and a ground contact width W3 in the tire width direction of a shoulder land portion defined by the respective tread ground contact edge T and the respective main groove on the outermost side in the tire width direction satisfy a relationship of 0.05≤ (L3/W3)≤0.40.

12. The pneumatic tire according to claim 1, wherein the respective bead portion comprises a bead core and a bead filler disposed along the carcass layer on an outer side of the bead core in the tire radial direction, and a height H1 of the respective bead filler in the tire radial direction satisfies a range of 15% or more and 50% or less of a cross-sectional height SH of the pneumatic tire.

13. The pneumatic tire according to claim 1, wherein a volume of the sound absorptive member is 21% or more and 30% or less with respect to a cavity volume of the pneumatic tire.

14. The pneumatic tire according to claim 1, wherein the separation distance L1 is in a range of 32 mm or more and 50 mm or less.

* * * * *